(12) United States Patent
Van Patten Benhase et al.

(10) Patent No.: US 7,877,590 B2
(45) Date of Patent: *Jan. 25, 2011

(54) CONSISTENT DATA STORAGE SUBSYSTEM CONFIGURATION REPLICATION

(75) Inventors: Linda Van Patten Benhase, Tucson, AZ (US); John Charles Elliott, Tucson, AZ (US); Robert Akira Kubo, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 732 days.

This patent is subject to a terminal disclaimer.

(21) Appl. No.: 11/837,938

(22) Filed: Aug. 13, 2007

(65) Prior Publication Data

US 2009/0049290 A1 Feb. 19, 2009

(51) Int. Cl.
G06F 9/00 (2006.01)
G06F 1/00 (2006.01)
G06F 15/177 (2006.01)
G06F 13/00 (2006.01)

(52) U.S. Cl. .............. 713/1; 713/2; 713/300; 713/330; 709/220; 711/114

(58) Field of Classification Search .......... 713/1, 713/2, 330, 300; 709/220; 711/114
See application file for complete search history.

(56) References Cited

U.S. PATENT DOCUMENTS

| | | | | |
|---|---|---|---|---|
| 6,636,957 B2 | 10/2003 | Stevens et al. | ............. | 711/171 |
| 6,931,558 B1 | 8/2005 | Jeffe et al. | ............. | 713/340 |
| 7,013,385 B2 | 3/2006 | Abbondanzio et al. | ......... | 713/2 |
| 7,127,556 B2 | 10/2006 | Blumenau et al. | ............. | 711/113 |
| 7,165,158 B1 | 1/2007 | Yagawa | ............. | 711/165 |
| 7,478,177 B2* | 1/2009 | Cherian et al. | ............. | 710/9 |
| 2004/0215949 A1* | 10/2004 | Dennis et al. | ............. | 713/1 |
| 2006/0184811 A1* | 8/2006 | Kasprzak et al. | ............. | 713/300 |
| 2006/0265449 A1* | 11/2006 | Uemura et al. | ............. | 709/203 |
| 2007/0005662 A1 | 1/2007 | Bankston et al. | ............. | 707/201 |

OTHER PUBLICATIONS

"A Self-Organizing Storage Cluster for Parallel Data-Intensive Applications", Hong Tang et al., Nov. 2004, Proceedings of the 2004 ACM/IEEE conference on Supercomputing SC '04.
"Ensemble-level Power Management for Dense Blade Servers", Parthasarathy Ranganathan et al., May 2006, ACM SIGARCH Computer Architecture News. Proceedings of the 33$^{rd}$ annual international symposium on Computer Architecture ISCA '06, vol. 34, Issue 2.

* cited by examiner

*Primary Examiner*—Mark Connolly
(74) *Attorney, Agent, or Firm*—John H. Holcombe

(57) ABSTRACT

Consistency for replicating data storage subsystem configurations in accordance with a "golden" configuration file. A data storage subsystem comprises a blade system with a plurality of slots, the blade system configured to support a plurality of blades and a storage system, each arranged in a predetermined slot of the blade system. A management module operates the blade system to first power on the storage system, and subsequently to power on the plurality of server blades in a sequential order that matches a blade system natural boot sequence order, skipping the storage system, and the storage system is configured with the "golden" configuration file to log on the server blades in accordance with the power on sequence to logically configure the server blades in accordance with the "golden" configuration file.

16 Claims, 4 Drawing Sheets

US 7,877,590 B2

CONSISTENT DATA STORAGE SUBSYSTEM CONFIGURATION REPLICATION

DOCUMENT INCORPORATED BY REFERENCE

Commonly assigned, U.S. patent application Ser. No. 11/460,166, filed Jul. 26, 2006, now U.S Pat. No. 7,565,488, issued Jul. 21, 2009, is incorporated for its showing of a RAID controller and storage disposed in a storage blade enclosure with server blades.

CROSS REFERENCE TO RELATED APPLICATIONS

Commonly assigned U.S. patent application Ser. No. 11/837,966, filed on even date herewith, Aug. 13, 2007, relates to a blade system configured to support a plurality of blades and a storage system, each arranged in a predetermined slot of the blade system. A management module operates the blade system to first power on the storage system. In accordance with a "golden" configuration file, the storage system passes sequence information to the management module. The management module powers on the plurality of server blades in accordance with the sequence information. The storage system is configured with the "golden" configuration file to log on the server blades in accordance with the power on sequence to logically configure the server blades in accordance with the "golden" configuration file.

Commonly assigned U.S. patent application Ser. No. 11/837,985, filed on even date herewith, Aug. 13, 2007, relates to a blade system configured to support a plurality of blades and a storage system, each arranged in a predetermined slot of the blade system, and at least one zoneable switch whose zoning is disabled at power on. A management module operates the blade system to power on all slots. The storage system, in accordance with a "golden" configuration file, transfers port enablement sequencing to the switch, and the switch enables ports in sequence to allow the server blades to see the storage system in accordance with the port enablement sequence. The storage system is configured with the "golden" configuration file to log on the server blades in accordance with the port enablement sequence to logically configure the server blades in accordance with the "golden" configuration file.

Commonly assigned U.S. patent application Ser. No. 11/838,005, filed on even date herewith, Aug. 13, 2007, now U.S. Pat. No. 7,716,309, issued May 5, 2010, relates to a blade system configured to support a plurality of blades and a storage system, each arranged in a predetermined slot of the blade system. The server blade slot versus WWN information is collected and provided to the storage system. The storage system arranges a configuration of the server blades in accordance with a "golden" configuration file, converting "golden" configuration file slot information to WWNs. The server blades are logically configured as they log on with WWNs in accordance with the "golden" configuration file.

FIELD OF THE INVENTION

This invention relates to data storage subsystems, and, more particularly, to the configurations of data storage subsystems.

BACKGROUND OF THE INVENTION

Data storage subsystems, such as subsystems comprising numbers of hard disk drives, for example, in blade and in RAID (Redundant Array of Independent Disks) arrangements, may be configured manually by or for customers who want particular files or logical volumes to be available for particular circumstances.

In one example, a customer with retail centers across the country or world may wish to have several applications that access certain files of the data at each retail center. Examples include a real time transaction application, a back up application, an inventory application, etc., and all will own some of the logical volumes stored by the data storage subsystem. The customer may also want the logical volumes and applications to be consistent across the country or world.

In accordance with the incorporated '166 Application, a blade system may now comprise the storage system and servers in the form of blades.

To meet the consistency criteria, a manual boot up may be conducted at each blade system instead of a normal boot up which may follow a particular sequence, such as slot number, in a blade arrangement, and the storage system and files manually configured with respect to the servers.

SUMMARY OF THE INVENTION

Data storage subsystems, computer program products and methods provide consistency for replicating data storage subsystem configurations.

In one embodiment, a "golden" configuration file is created for a data storage subsystem which comprises a blade system with a plurality of slots, the blade system configured to support a plurality of blades; a plurality of server blades, each arranged in a predetermined slot of the blade system; and at least one storage system arranged in a predetermined slot of the blade system. A management module is configured to operate the blade system to first power on the storage system, and subsequently to power on the plurality of server blades in a sequential order that matches a blade system natural boot sequence order, skipping the storage system, and the storage system is configured with the "golden" configuration file to log on the server blades in accordance with the power on sequence to logically configure the server blades in accordance with the "golden" configuration file.

In a further embodiment, the storage system is configured to employ the "golden" configuration file to create a logical configuration matching "placeholder" hosts to the expected order of log on of the server blades.

In a still further embodiment, the "placeholder" hosts are replaced by server blade WWNs as the server blades log on.

In another embodiment, the storage system is configured to allocate a set of logical volumes of the storage system to each server blade in accordance with the "golden" configuration file.

In still another embodiment, the management module is configured to stop the power on sequence after powering on the storage system and resume with the natural power on sequence in response to "ready" from the storage system.

In another embodiment, a data storage subsystem comprises a blade system with a plurality of slots, the blade system configured to support a plurality of blades; a plurality of server blades, each arranged in a slot of the blade system; at least one storage system arranged in at least one slot of the blade system, the storage system configured to save a "golden" configuration file, identifying the host to slot number mapping of the server blades and at least one storage system, the "golden" configuration file arranged to provide a boot order log on sequence for a blade system matching a blade system natural boot sequence order.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
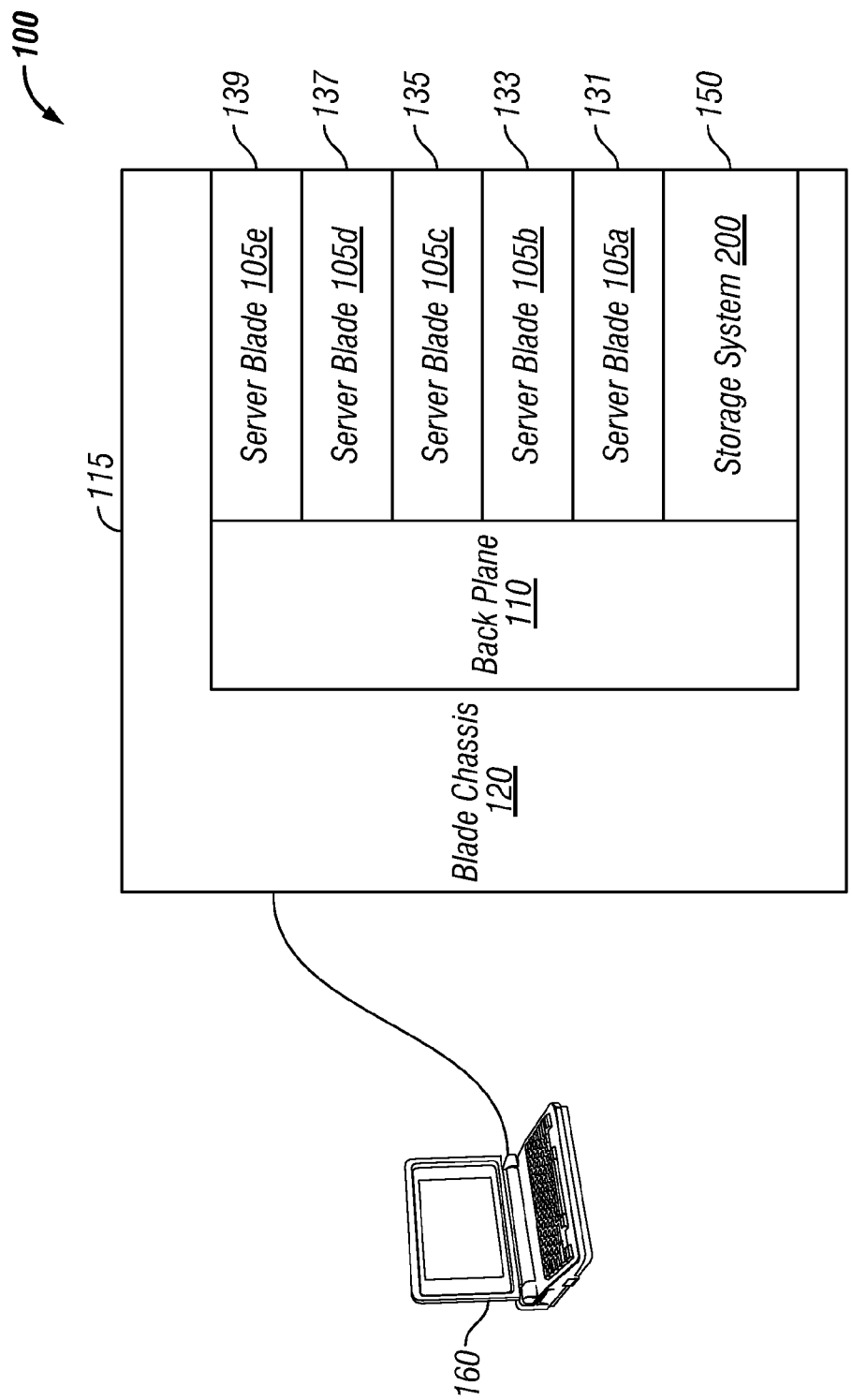
FIG. 1 is a block diagram of a data storage subsystem comprising a blade system.
Figure 2:
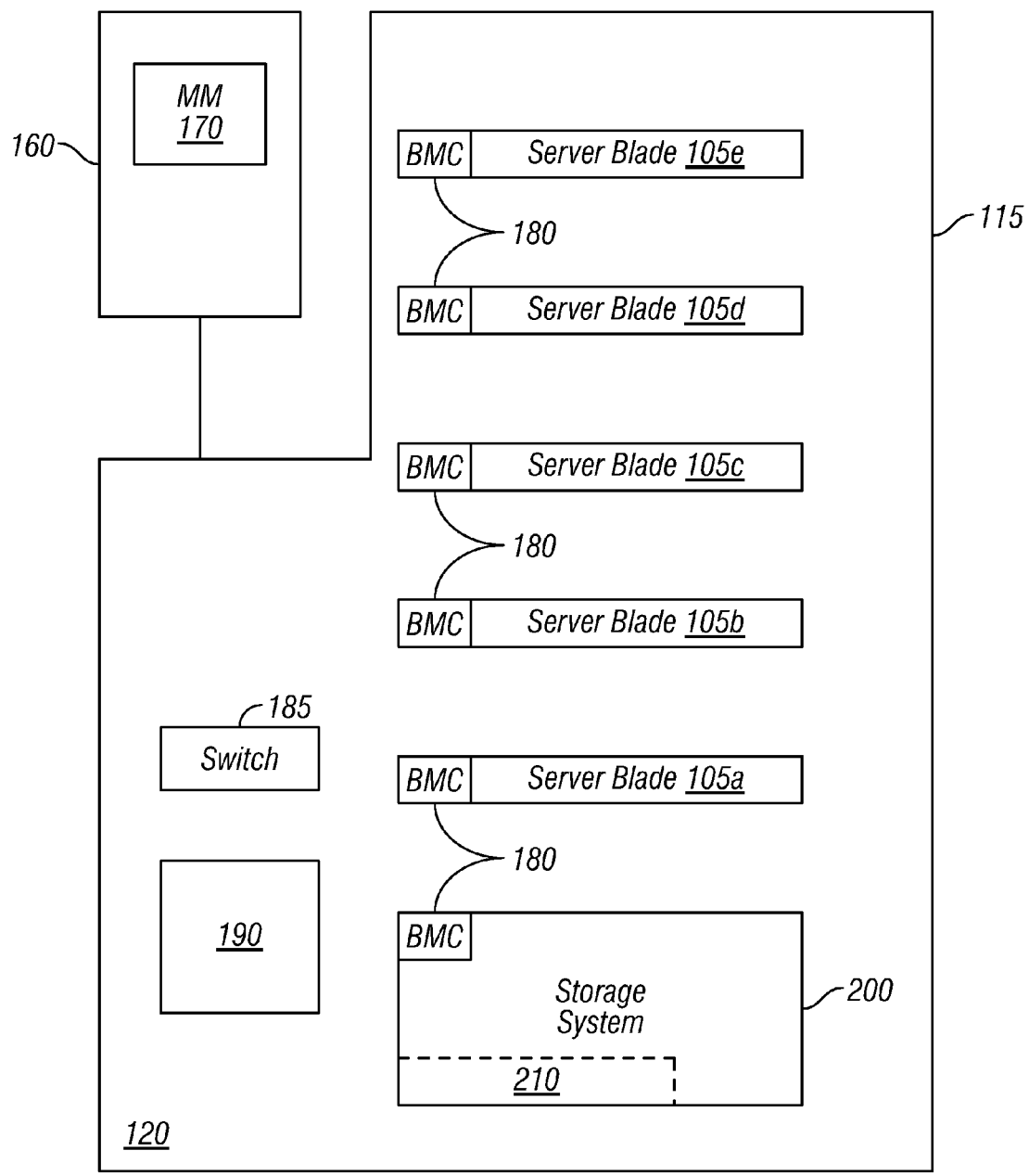
FIG. 2 is a diagrammatic illustration of the data storage subsystem of FIG. 1.

Referring to FIGS. 1 and 2, an embodiment of a data storage subsystem 100 comprises a blade system 115 and an external computer system 160. As described in more detail in the incorporated '166 Application, a blade system 115 may comprise servers 105 and one or more storage blades 200 mounted in a blade chassis 120 having a back plane 110. In one embodiment the blade chassis receives the server blades in slots 131-139 and a storage blade occupies slot 150. A slot may comprise mounting hardware for retaining a mounted device, as well as one or more interfaces such as data bus connectors, power couplings, air flow couplings, and the like for connecting a blade to the blade chassis 120. The mounting and connections are such that an administrator may easily replace a blade or add blades to vacant slots.

A server blade 105 may comprise one or more processors, one or more memory modules, interfaces and interface logic. Each server blade 105 may communicate with the back plane 110. A storage blade 200 may comprise a storage system of a controller or controllers 210 and one or more storage modules, for example, of hard disk drives. A data storage controller may comprise logic or one or more computer processors and memory, for example, arranged in a redundant system. The storage blade may be arranged in a RAID system of any suitable type, or may comprise a system known as JBOD (Just a Bunch of Disks). Examples of RAID systems are discussed in the incorporated '166 Application. Alternatively, the storage system 200 may be partially arranged in a slot of the blade system, and partially arranged externally to the slots and in direct communication with the blade system.

The invention can take the form of an entirely hardware embodiment, an entirely software embodiment or an embodiment containing both hardware and software elements. In a preferred embodiment, the invention is implemented in software, which includes but is not limited to resident software, microcode, firmware, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, or transport the program for use by or in connection with the instruction execution system, apparatus, or device.

The medium can be an electronic, magnetic, optical, or semiconductor system (or apparatus or device). Examples of a computer readable medium include a semiconductor or solid state memory, magnetic tape, a removable computer diskette, and random access memory (RAM), a read-only memory (ROM), a rigid magnetic disk and an optical disk. Current examples of optical disks include compact disk—read only memory (CD-ROM), compact disk—read/write (CD-R/W), DVD, and Blu-Ray.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Connections to the receiver may encompass connection links including intervening private or public networks. The communication links may comprise serial interconnections, such as RS-232 or RS-422, Ethernet connections, SCSI interconnections, ESCON interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

The blade system 115 may comprise logic, a computer processor, etc., such as baseboard management controller function 180, for example, provided with respect to each server blade. The back plane 110 may comprise one or more switches 185, and comprise data bus connectors, power components including battery backup, air conditioning and flow components, and the like, indicated as element 190. The blade system 115 may comprise a storage area network, and/or be connected to an external storage area network.

The server blades may comprise or support applications that communicate with the storage blade, and that use particular files or logical volumes of the storage blade.

External computer system 160 may comprise one or more computer processors, logic, etc., configured for example as storage blade system management software or management module 170, configured to control much of the operation of the blade system 115. As one example, the external computer system 160 may comprise a PC. The management module 170 may comprise an application or the dominant application of the computer system 160. The management module 170 sets up and controls the logical configuration of the blade system, and controls and manages the blade system domain, which includes server blades, power supplies, fans, user interface, etc. Alternatively, the management module 170 may be internal to the blade system. Herein, the terms blade system storage management software and management module refer to one or more computer program products or programs for operating a blade system. Herein, the terms data storage controller or controllers, RAID controller or controllers, or controller or controllers, refer to one or more computer program products or programs for operating a storage system. The computer program product comprises a computer usable medium embodying a computer readable program when executed on a computer causes the computer to conduct a desired operation, as discussed above.

Blade systems may be provided on a local basis, for example, employed with a retail center of a national or international chain. As discussed above, customers may want these uses to be consistent across the country or world. In one example, a customer with retail centers across the country or world may wish to have several applications that access certain files of the data at each retail center. Examples include a real time transaction application, a back up application, an inventory application, etc., and all will own some of the logical volumes stored by the data storage subsystem. The customer may also want the logical volumes and applications to be consistent across the country or world.

Figure 3:
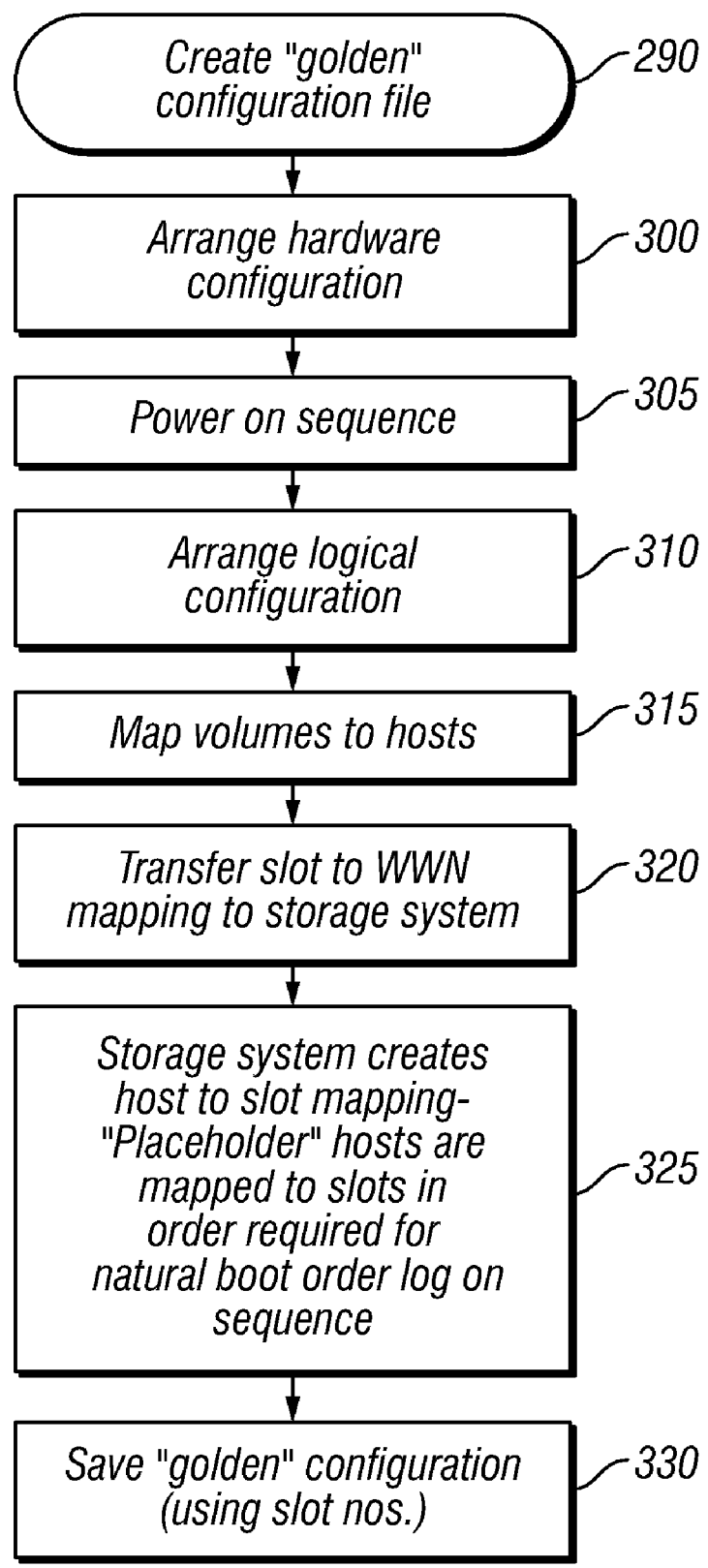
FIG. 3 is a flow chart depicting a computer implemented method for establishing a "golden" configuration file for a blade system.

Referring additionally to FIG. 3, in one embodiment, a blade system configuration may be established which is then distributed to local retail centers, including a "golden" configuration file created in the process beginning at step 290. In step 300, a plurality of server blades 105 and at least one storage system 200 with at least one data storage controller 210 are each arranged in a desired slot of the blade system, for example, by the user or administrator.

In step 305, an administrator, for example at the computer system 160, starts a manual power on sequence of the blade system 115. The power on operation may comprise the operation of switches 185, etc., which, for the purpose of this invention, are considered ancillary. The manual power on sequence, in step 310, begins first with the storage system 200. The power on may be conducted by having the management module first place the blades in a standby state, for example by the baseboard management controller 180, and collect the inventory of WWNs and slot numbers for the blades. With this inventory, the user or administrator may direct the power on of the data storage controller. The user or administrator may have arranged the storage system 200 in advance, for example, to comprise one or more RAID systems employing one or more data storage controllers 210. A data storage controller may be employed additionally to develop the "golden" configuration file.

In step 310, the user or administrator arranges the various hosts in accordance with the desired storage system arrangement. As an example, the storage system may be arranged as two RAID arrays of different types and a spare drive. Each of the hosts is logically arranged to utilize volumes of one or both of the RAID arrays, perhaps having different applications which each uses the same or different volumes of the same RAID array. In step 315, the volumes are manually assigned or allocated to the hosts, and mapped by the storage system, using the host WWNs.

In step 320, the slot to WWN mapping is transferred to the storage system, for example, by the management module 170. Alternatively, the user or administrator provides the slot to WWN mapping to the storage system. In step 325, the storage system creates host to slot mapping using the transferred slot to WWN mapping. "Placeholder" host names are mapped to the slots in the order required for a natural management module boot order to create the proper log on sequence. The log on sequence is key because the volume assignments or allocations are made by the storage system based on the sequence of log on. Also, some server blades may take longer than others to boot up. Thus, the arrangement of the hosts will have to compensate so that the natural power on sequence results in the natural boot order log on sequence.

In step 330, the storage system saves the "golden" configuration file, identifying the slot number and "placeholder" hosts of the server blades for use with the natural boot order sequence. Additionally, the allocations of sets of logical volumes of the storage system to each server blade may be saved as part of the "golden" configuration file. The "golden" configuration file of step 330 is arranged to provide a power on sequence for another blade system. The storage system may comprise special storage configuration management software that saves the "golden" configuration file and that may be separated from the remainder of the storage system module.

The "golden" configuration file may then be distributed to storage systems of other blade systems at the locations, for example retail centers, across the country or world that the customer wishes to be consistent.

Figure 4:
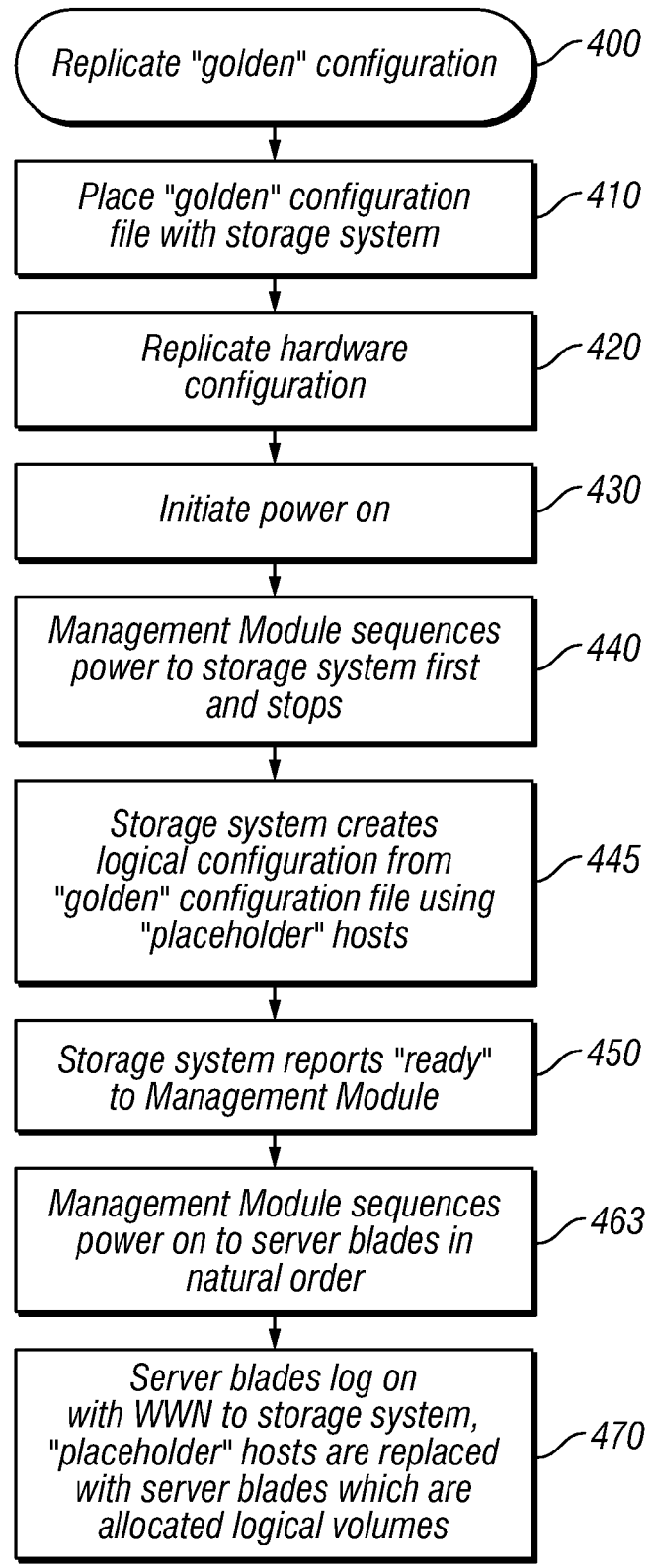
FIG. 4 is a flow chart depicting a computer implemented method for conducting a configuration of the data storage subsystem of FIGS. 1 and 2.

Referring additionally to FIG. 4, in step 400, the process to replicate the "golden" configuration is initiated, and, in step 410, the "golden" configuration file is placed with the storage system 200. With respect to FIG. 4, the data storage subsystem of FIGS. 1 and 2 represents an "other" data storage subsystem to which the "golden" configuration file has been distributed. In step 420, the physical hardware comprising storage system 200 and the server blades 105 are installed in a blade system 115, for example at a customer location, in the identical slots as the original "golden" configuration.

The "golden" configuration is implemented, beginning at step 430, in which the management module 170 initiates the power on of the blade system, for example the baseboard management controller 180, to place the blades in a standby state. The management module begins the power on sequence in accordance with the "golden" configuration map in step 440 by powering on the storage system 200 first. In one embodiment, the hardware arrangement of step 420 is such that the storage system is placed in the slot 150 that is naturally powered on first. In another embodiment, the management module also comprises program code causing the management module to first power on the slot at which the storage system is located. In either embodiment, the management module stops the power on sequence after powering on the storage system. In one embodiment, the management module program code causes the stoppage. In another embodiment, the storage system transfers an instruction to the management module.

In step 445, the storage system implements the "golden" configuration, creating the logical configuration from the "golden" configuration file. The logical configuration of the storage system, such as the RAID configuration, may have been preset, and the operation creating the logical configuration comprises relating the utilization of the volumes to the hosts, but using "placeholder" hosts as substitute names until the actual server blades log on.

The logical configuration arranges the "placeholder" hosts so that they match the blade system natural boot sequence order of log on of the server blades, given the power on sequence of the management module.

In step 450, the storage system 200 reports "ready" to the management module.

In step 463, in response to "ready" from the storage system, the management module operates the blade system, for example, the baseboard management controller 180, to power on the plurality of server blades 105 in a sequential order that matches a blade system natural boot sequence order, skipping the data storage controller. The natural boot sequence order is to proceed in sequence up or down the slots. In the example, this comprises first powering on server blade 105*a* in slot 131, then powering on server blade 105*b* in slot 133, etc., until server blade 105*e* in slot 139 is powered on.

Then in step 470, as the server blades are powered on and log on to the storage system, the storage system allocates sets of logical volumes of the storage system to each server blade. This allocation or assignment comprises replacing the "placeholder" host names with the server blade WWNs as the server blades log on after having been powered on. The server blades thus are logged on individually in the natural boot sequence order and are thereby configured in accordance with the "golden" configuration map.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data storage subsystem comprising:
   a blade system comprising a plurality of slots, said blade system configured to support a plurality of blades;
   a plurality of server blades, each arranged in a predetermined slot of said blade system;
   at least one storage system arranged in at least one predetermined slot of said blade system; and
   a management module configured to operate said blade system to first power on said at least one storage system, and subsequently to power on said plurality of server blades in a sequential order that matches a blade system natural boot sequence order, skipping said at least one storage system; and a golden configuration file distributed to and placed with said storage system, said golden configuration file is configured to cause said storage system to log on said server blades in accordance with said power on sequence and to logically configure said server blades in accordance with said golden configuration file.

2. The data storage subsystem of claim 1, wherein said storage system is configured to employ said golden configuration file to create a logical configuration matching placeholder hosts to the expected order of log on of said server blades.

3. The data storage subsystem of claim 2, wherein said storage system is configured to employ said golden configuration file to replace said placeholder hosts by server blade WWNs as said server blades log on.

4. The data storage subsystem of claim 1, wherein said storage system is configured to allocate a set of logical volumes of said storage system to each said server blade in accordance with said golden configuration file.

5. The data storage subsystem of claim 1, wherein said management module is configured to stop said power on sequence after powering on said storage system and resume with said natural power on sequence in response to ready from said storage system.

6. A method for replicating data storage subsystem configuration comprising a blade system comprising a plurality of slots, said blade system configured to support a plurality of blades, said method comprising the steps of:
   arranging a plurality of server blades in predetermined slots of said blade system;
   arranging at least one storage system in at least one predetermined slot of said blade system; and
   operating said blade system to first power on said at least one storage system, and subsequently to power on said plurality of server blades in a sequential order that matches a blade system natural boot sequence order, skipping said at least one storage system; and, in accordance with a golden configuration file distributed to and placed with said storage system, log on said server blades to said storage system in accordance with said power on sequence and to logically configure said server blades in accordance with said golden configuration file.

7. The method of claim 6, comprising the step of creating a logical configuration matching placeholder hosts to the expected order of log on of said server blades.

8. The method of claim 7, comprising the step of replacing said placeholder hosts with server blade WWNs as said server blades log on.

9. The method of claim 6, additionally comprising the step of allocating a set of logical volumes of said storage system to each said server blade in accordance with said golden configuration file.

10. The method of claim 6, wherein said step of operating said blade system additionally comprises stopping said power on sequence after powering on said storage system, and resuming with said natural power on sequence in response to ready from said storage system.

11. A computer program product for replicating data storage subsystem configuration comprising a blade system comprising a plurality of slots, said blade system configured to support a plurality of blades, and comprising a plurality of server blades in predetermined slots of said blade system, and at least one storage system in at least one predetermined slot of said blade system; said computer program product comprising a non-transitory computer usable medium embodying a computer readable program when executed on at least one computer causes the computer to:
   operate said blade system to first power on said at least one storage system;
   operate said blade system to subsequently to power on said plurality of server blades in a sequential order that matches a blade system natural boot sequence order, skipping said at least one storage system; and
   in accordance with a golden configuration file distributed to and placed with said storage system, operate said storage system to log on said server blades in accordance with said power on sequence to logically configure said server blades in accordance with said golden configuration file.

12. The computer program product of claim 11, wherein said computer executed steps of operating said storage system comprises creating a logical configuration matching placeholder hosts to the expected order of log on of said server blades.

13. The computer program product of claim 12, wherein said computer executed step of operating said storage system comprises replacing said placeholder hosts with server blade WWNs as said server blades log on.

14. The computer program product of claim 11, additionally comprising the computer executed step of initiating operation of said storage system to allocate a set of logical volumes of said storage system to each said server blade in accordance with said golden configuration file.

15. The computer program product of claim 11, additionally comprising the computer implemented steps of stopping said power on sequence after powering on said storage system, and resuming with said natural power on sequence in response to ready from said storage system.

16. A data storage subsystem comprising:
   a blade system comprising a plurality of slots, said blade system configured to support a plurality of blades;
   a plurality of server blades, each arranged in a slot of said blade system;

at least one storage system arranged in at least one slot of said and blade system;

wherein the storage system is configured to save a golden configuration file, identifying host to slot number mapping of said server blades and at least one storage system, said golden configuration file arranged to be distributed to and placed with another storage system to provide a boot order log on sequence for another blade system matching a blade system natural boot sequence order.

* * * * *